United States Patent
Stevens

(10) Patent No.: US 8,171,805 B2
(45) Date of Patent: May 8, 2012

(54) NON-CONTACT TORQUE DETERMINATION SYSTEM AND METHOD FOR A NON-MECHANICALLY COUPLED ROTATING SYSTEM

(75) Inventor: Carlos J. Stevens, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 275 days.

(21) Appl. No.: 12/708,117

(22) Filed: Feb. 18, 2010

(65) Prior Publication Data

US 2011/0197683 A1 Aug. 18, 2011

(51) Int. Cl.
G01L 3/02 (2006.01)

(52) U.S. Cl. .............. 73/862.324; 73/862.333

(58) Field of Classification Search .......... 73/862.324–862.333
See application file for complete search history.

(56) References Cited

U.S. PATENT DOCUMENTS

| | | |
|---|---|---|
| 3,548,649 A | 12/1970 | Parkinson |
| 3,599,492 A * | 8/1971 | Kalmus et al. ............. 73/382 R |
| 3,921,446 A | 11/1975 | Ludloff |
| 4,169,371 A | 10/1979 | Witschi et al. |
| 4,468,972 A | 9/1984 | Fisher et al. |
| 4,501,138 A | 2/1985 | McCandless |
| 4,517,648 A | 5/1985 | Ina et al. |
| 4,522,026 A | 6/1985 | Peterson et al. |
| 4,682,505 A | 7/1987 | Morissette et al. |
| 4,758,967 A | 7/1988 | Shmuter et al. |
| 5,001,937 A | 3/1991 | Bechtel et al. |
| 5,389,780 A | 2/1995 | Anderson |
| 5,485,757 A | 1/1996 | Foxwell |
| 5,508,609 A * | 4/1996 | Parkinson et al. ....... 324/207.25 |
| 5,523,561 A | 6/1996 | Ironside et al. |
| 6,247,445 B1 | 6/2001 | Langer |
| 6,251,044 B1 | 6/2001 | Streib |
| 6,285,024 B1 | 9/2001 | Pinnock |
| 6,389,910 B1 * | 5/2002 | Eisenhauer ............... 73/862.193 |
| 6,604,412 B2 | 8/2003 | Jankovic et al. |
| 6,759,648 B2 | 7/2004 | Baxter et al. |
| 6,761,075 B2 | 7/2004 | Steinlechner et al. |
| 6,817,528 B2 | 11/2004 | Chen |
| 6,852,066 B2 | 2/2005 | Senger et al. |
| 6,946,650 B2 | 9/2005 | Yoerger et al. |
| 6,964,192 B2 | 11/2005 | Bauer et al. |
| 7,112,904 B2 | 9/2006 | Akiyama |
| 7,194,997 B2 | 3/2007 | Pitzal et al. |
| 7,237,444 B2 | 7/2007 | Berdichevsky et al. |
| 7,292,325 B2 | 11/2007 | Lee |
| 7,389,682 B2 * | 6/2008 | JaVaherian ................. 73/117.02 |
| 7,757,570 B1 * | 7/2010 | Marin et al. ............. 73/862.333 |

OTHER PUBLICATIONS

USPTO Office Action, U.S. Appl. No. 12/244,566, Notification date Sep. 26, 2011.

(Continued)

*Primary Examiner* — Max Noori
(74) *Attorney, Agent, or Firm* — Ingrassia Fisher & Lorenz, P.C.

(57) ABSTRACT

Methods and apparatus are provided for determining torque in an environmentally isolated system. A drive system is coupled to the environmentally isolated system via a non-contact, magnetic coupling that has a known angular stiffness and at least two coupling sections. A relative deflection of each coupling section is optically measured, and the torque is determined based on the relative deflection and the known angular stiffness.

20 Claims, 4 Drawing Sheets

OTHER PUBLICATIONS

T700 Training Guide, Jun. 1979, Published by General Electric Company Aircraft Engine Group, Technical Training Operation, Lynn, MASS 01910.

EP Search Report, EP 11153270.1-1236 dated Jun. 28, 2011.
EP Communication, EP 11153270.1-1236 dated Jun. 15, 2011.

* cited by examiner

NON-CONTACT TORQUE DETERMINATION SYSTEM AND METHOD FOR A NON-MECHANICALLY COUPLED ROTATING SYSTEM

TECHNICAL FIELD

The present invention generally relates to torque determination, and more particularly relates to a system and method of determining torque in a non-mechanically coupled rotating system.

BACKGROUND

Numerous and varied methods have been derived for determining the torque on a rotating system. Some examples of known methods include the use of magnetic brakes, strain gage transducers, and system drive motor current. To implement the first method, a magnetic brake with a known magnetic field based on a current and associated reaction torque is coupled to a rotary portion of the system. During operation, the current supplied to generate the magnetic field is used to determine the applied torque. To implement the second method, a strain gage transducer is coupled to the rotating portion of the system and signals and power transferred across slip rings. Torque is derived based on the torsional stress in the shaft to which the gage is coupled. To implement the third method, a drive motor with a known torque constant is coupled to and drives the rotating portion of the system. The torque is then determined using the known torque constant and the current supplied to the system.

Each of the above methods has its advantages. However, because each relies on a component being mechanically coupled, in one fashion or another, to the rotating system, these methods are unsuitable for determining the torque in an environmentally isolated rotating system with sufficient accuracy.

Hence, there is a need for a system and method for determining torque in an environmentally isolated rotating system that does not rely on mechanical coupling to, or contact with, the rotating system. The present invention addresses at least this need.

BRIEF SUMMARY

In one exemplary embodiment, a system for determining torque includes an outer rotor, an inner rotor, a first optical transceiver, a second optical transceiver, and a processor. The outer rotor includes an inner volume, and is responsive to a drive torque to rotate. The inner rotor is rotationally mounted, and is disposed at least partially within the inner volume of the outer rotor. The inner rotor is spaced apart from, and magnetically coupled to, the outer rotor to rotate therewith. The first optical transceiver is disposed adjacent the outer rotor. The first optical transceiver is configured to selectively transmit first incident light toward, and receive reflected first incident light from, the magnetic outer rotor. The first optical transceiver is further configured to generate a first signal in response to received reflected first incident light. The second optical transceiver is disposed adjacent the inner rotor. The second optical transceiver is configured to selectively transmit second incident light toward, and receive reflected second incident light from, the inner rotor. The second optical transceiver is further configured to generate a second signal in response to received reflected second incident light. The processor is coupled to receive the first signal and the second signal and is configured, upon receipt thereof, to determine torque on the magnetically permeable rotor.

In another exemplary embodiment, a system for determining torque includes a magnetic coupling, a first optical transceiver, a second optical transceiver, and a processor. The magnetic coupling has a known angular stiffness, is adapted to receive an input torque and supply a drive torque to a load, and includes an outer rotor that is magnetically coupled to and an inner rotor. The first optical transceiver is disposed adjacent the outer rotor. The first optical transceiver is configured to selectively transmit first incident light toward, and receive reflected first incident light from, the outer rotor. The first optical transceiver is further configured to generate a first signal in response to received reflected first incident light. The second optical transceiver is disposed adjacent the inner rotor. The second optical transceiver is configured to selectively transmit second incident light toward, and receive reflected second incident light from, the inner rotor. The second optical transceiver is further configured to generate a second signal in response to received reflected second incident light. The processor is coupled to receive the first signal and the second signal and is configured to determine torque on the magnetically permeable rotor based on the known angular stiffness and the first and second signals.

In still another exemplary embodiment, a method of determining torque in an environmentally isolated system includes coupling a drive system to the environmentally isolated system via a non-contact, magnetic coupling that has a known angular stiffness and at least two coupling sections. A relative deflection of each coupling section is optically measured, and the torque is determined based on the relative deflection and the known angular stiffness.

Furthermore, other desirable features and characteristics of the torque determination system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although a particular preferred embodiment is described as being implemented with a test fixture that is used to test bearing assemblies and to measure the drag torque of bearing assemblies, the system and method may be used with and in various other systems, components, devices, and environments.

Figure 1:
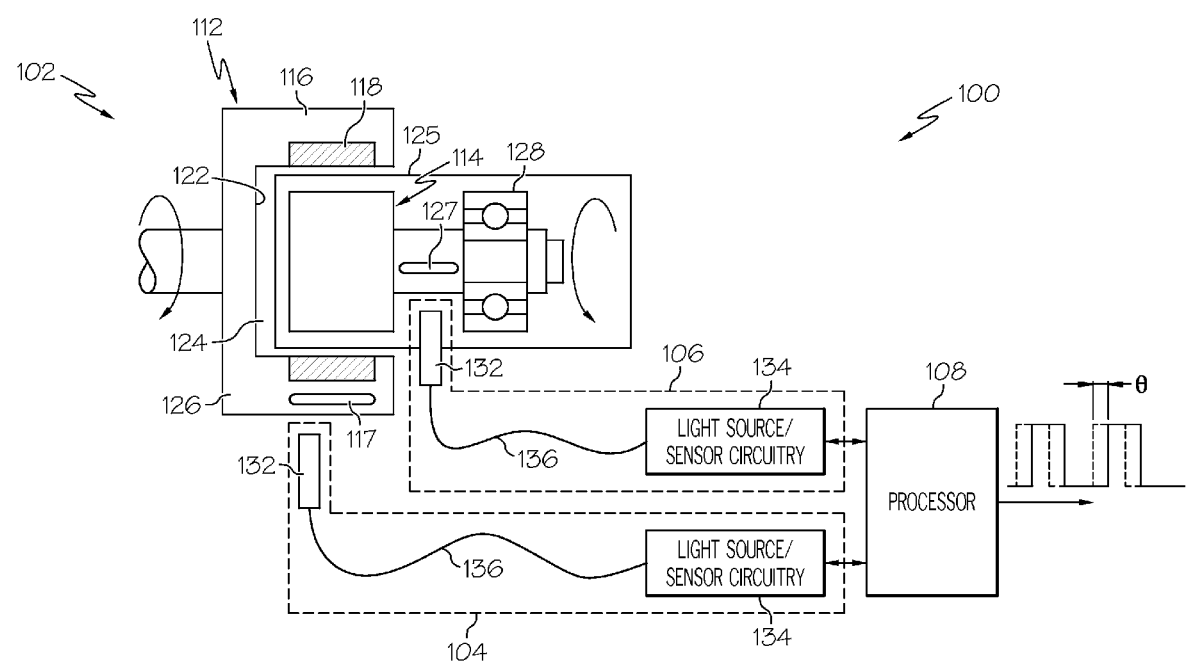
FIG. 1 depicts a functional block diagram of a non-contact system for determining torque.

Referring first to FIG. 1, a functional block diagram of an exemplary non-contact torque determination system 100 is depicted, and includes a magnetic coupling 102, a first optical transceiver 104, a second optical transceiver 106, and a processor 108. The magnetic coupling 102 includes an outer rotor 112 and an inner rotor 114. The outer rotor 112 is responsive to a drive torque to rotate, and includes a hub 116 and, in the depicted embodiment, one or more magnets 118. The outer rotor 112 is thus referred to throughout the remainder of this document as the magnetic rotor. It will be appreciated that the hub 116 and magnets 118 could be integrally formed or separately formed and coupled to together. Moreover, although the drive torque may be supplied to the magnetic rotor 112 from any one of numerous sources, in a particular embodiment, which will be described in more detail further below, the source is a motor.

The magnetic rotor 112 additionally includes an inner surface 122 that defines an inner volume 124, and an outer surface 126. In the depicted embodiment, the one or more magnets 118 are depicted as being disposed on or near the inner surface 122. It will nonetheless be appreciated that the one or more magnets could be disposed on or near the outer surface 126. A first reflective feature 117 is disposed on the outer surface 126. The first reflective feature 117 provides a contrast surface reflection, the purpose of which is described further below. The first reflective feature 117 may be variously implemented. Some non-limiting examples include a surface feature that is formed in the outer surface 126 or a reflective strip that is disposed on the outer surface 126.

The inner rotor 114 is preferably formed, at least partially, of any one of numerous magnetically permeable materials. As such, it is referred to throughout the remainder of this document as the magnetically permeable rotor. The magnetically permeable rotor 114 is rotationally mounted, and is disposed, at least partially, within the inner volume 124 of the magnetic rotor 112. The portion of the magnetically permeable rotor 114 that is within the inner volume 124 is spaced apart from, but is magnetically coupled to, the magnetic rotor 112. Though not depicted, the magnetically permeable rotor 114 is preferably configured with one or more lobes, with the number of lobes preferably matching the number of magnets 118. Thus, when the magnetic rotor 112 rotates, the magnetically permeable rotor 114 rotates synchronously therewith. The magnetically permeable rotor 114 may be rotationally mounted via various means and methods. In the depicted embodiment, however, it is rotationally mounted via one or more bearing assemblies 128 (only one depicted in FIG. 1) and is coupled to a load. In a particular preferred embodiment, which is described in more detail further below, the load is a test shaft, which is rotationally mounted via the one or more bearing assemblies 128.

The magnetically permeable rotor 114 includes an outer surface 115, which has a second reflective feature 127 disposed thereon. Similar to the first reflective feature 117, the second reflective feature 127 provides a contrast surface reflection. The second reflective feature 127 may be variously implemented. Some non-limiting examples include a surface feature that is formed in the outer surface 115 of the magnetically permeable rotor 114 or a reflective strip that is disposed on the outer surface 115 of the magnetically permeable rotor 114.

As FIG. 1 further depicts, the magnetically permeable rotor 114 is preferably disposed within a housing 125. This housing 125 is preferably formed of a non-magnetically permeable material. As such, the magnetic rotor 112 and the magnetically permeable rotor 114 are both physically isolated and thermally isolated from each other.

Before proceeding further it is noted that although the outer rotor 112 and inner rotor 114 are configured as (and referred to herein as) the magnetic rotor and the magnetically permeable rotor, respectively, this is merely exemplary of one particular embodiment. In other embodiments, the outer rotor 112 could be formed, at least partially, of any one of numerous magnetically permeable materials and concomitant lobes, and the inner rotor 114 could include the one or more magnets 118. In such embodiments the outer rotor 112 may be referred to as the magnetically permeable rotor, and the inner rotor 114 may be referred to as the magnetic rotor. In either of the embodiments, the outer rotor 112 and inner rotor 114 are magnetically, and non-mechanically, coupled together.

Returning once again to the description, the first optical transceiver 104 is disposed adjacent the magnetic rotor 112 and is configured to selectively transmit incident light toward the magnetic rotor 112. The first optical transceiver 104 is additionally configured to receive incident light that is reflected from the magnetic rotor 112, and generate a first signal each time it receives reflected incident light from the magnetic rotor 112. The second optical transceiver 106 is disposed adjacent the magnetically permeable rotor 114 and is configured to selectively transmit incident light toward the magnetically permeable rotor 114. The second optical transceiver 106 is additionally configured to receive incident light that is reflected from the magnetically permeable rotor 114, and generate a second signal each time it receives reflected incident light from the magnetically permeable rotor 114.

It is noted that, at least in a particular preferred embodiment, the first and second optical transceivers 104 and 106, the magnetic rotor 112, the magnetically permeable rotor 114, and the first and second reflective features 117 and 127, are implemented such that a characteristic of the first and second signals is varied each time the first and second reflective features 117 and 127, respectively, rotate past the first and second optical transceivers 104 and 106, respectively. The specific characteristic that is varied may be any one of numerous electrical characteristics. But in the depicted embodiment the amplitudes are varied. As such, the first and second signals are preferably manifested as pulse wave signals, such as, for example, the equal amplitude square wave pulse signals depicted in FIG. 1.

It will be appreciated that the first and second optical transceivers 104 and 106 may be variously configured and implemented. In the depicted embodiment, the first and second optical transceivers 104 and 106 include substantially identical transceiver probes 132 that are in operable communication with substantially identical light source/sensor circuitry devices 134 via substantially identical fiber optic cables 136. This is merely one example of an optical transceiver configuration and implementation. In other embodiments the first and second optical transceivers 104 and 106 may implemented such that the probes 132 light source/sensor circuitry devices 134 are integrally formed, thereby eliminating the need for the fiber optic cables.

In the depicted embodiment, each transceiver probe 132 is coupled to receive, via its associated fiber optic cable 136, incident light that is supplied from its associated light source/sensor circuitry device 134. Each transceiver probe transmits the incident light toward, and receives incident light that is reflected from, the magnetic rotor 112 or the magnetically permeable rotor 114, as the case may be. The reflected light that is received is supplied, via the appropriately associated fiber optic cable 136, to the appropriately associated light source/sensor circuitry device 134.

The light source/sensor circuitry devices 134 each include one or more non-illustrated light sources, such as laser light sources or LEDs, to name just two, and further include suitable non-illustrated control and sensor circuitry. The control and sensor circuitries control the light sources, and implement suitable optical-to-electrical signal conversion of the reflected light. The control and sensor circuitries are additionally configured to implement suitable signal conditioning including, for example, analog-to-digital conversion, filtering, amplification, etc., as needed or desired. Although the light source/sensor circuitry devices 134 are depicted as two physically separate devices, both could be implemented in the same integrated circuit package.

No matter the specific configuration and implementation of the first and second optical transceivers 104 and 106, the first and second signals that the transceivers respectively supply are received by the processor 108. The processor 108 is configured, upon receipt of the first and second signals, to determine the torque on the magnetically permeable rotor 114, which in the depicted embodiment corresponds to the drag torque of the one or more bearing assemblies 128. To do so, the processor 108 determines the phase difference between the first and second signals and, together with the angular stiffness of the magnetic coupling 102, calculates the torque.

Figure 2:
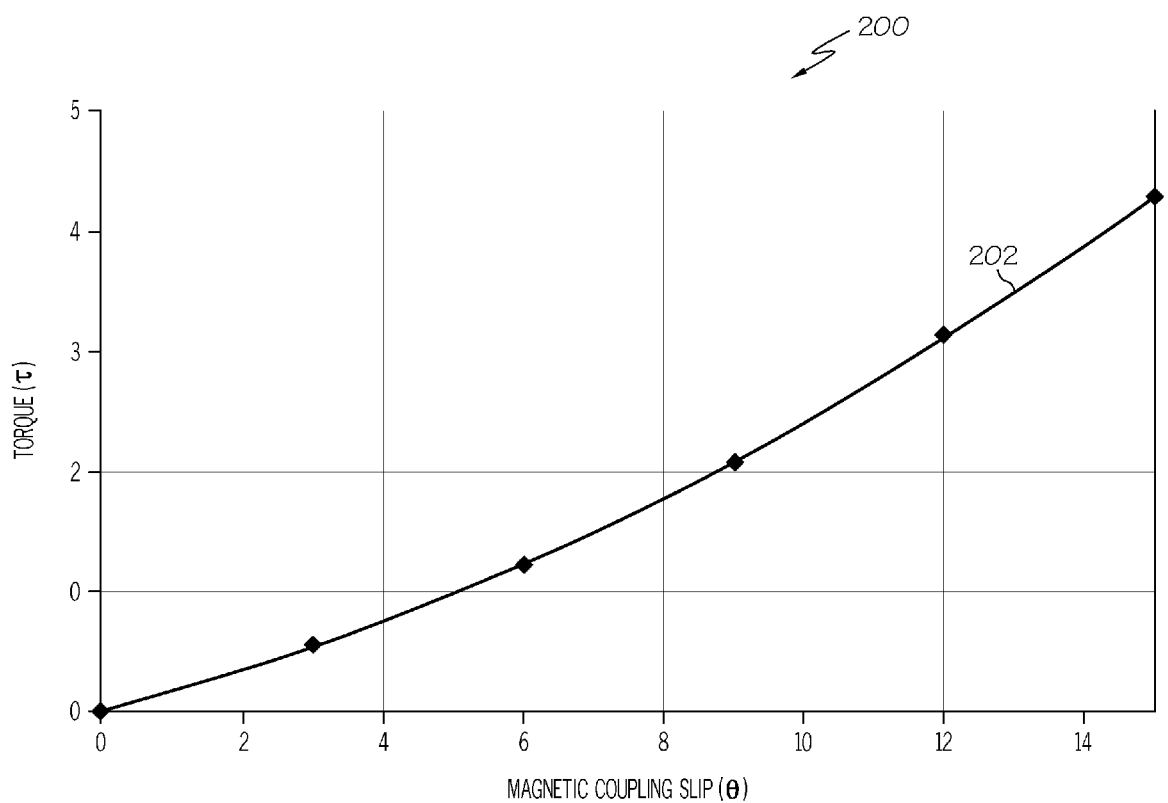
FIG. 2 depicts the angular stiffness of an exemplary magnetic coupling in the form of a graph of torque versus slip.

The angular stiffness of the magnetic coupling 102 is predetermined, and may be graphically represented in the form of magnetic coupling torque (τ) versus slip (θ). An exemplary graph of magnetic coupling torque versus slip for one particular magnetic coupling 102 embodiment is depicted in FIG. 2. The depicted curve 202 has a least squares best-fit characteristic equation of:

$$\tau = 0.0056\theta^2 + 0.1691\theta - 0.0014.$$

It will be appreciated that the depicted curve 202 and concomitant best-fit characteristic equation is merely exemplary of one particular magnetic coupling 102 embodiment, and that other curves and equations may apply for other magnetic coupling embodiments 102.

The angular stiffness of the magnetic coupling 102 is preferably stored in a non-illustrated memory. The memory may be on-board the processor 108 or be implemented as an external memory device that is readable by the processor 108. In either case, the processor 108, as was noted above, determines the phase difference between the first and second signals. The phase difference, as depicted in FIG. 1, corresponds to the slip (θ) of the magnetic coupling 102. The processor 108 may then determine the torque (τ) using the known angular stiffness.

Figure 3:
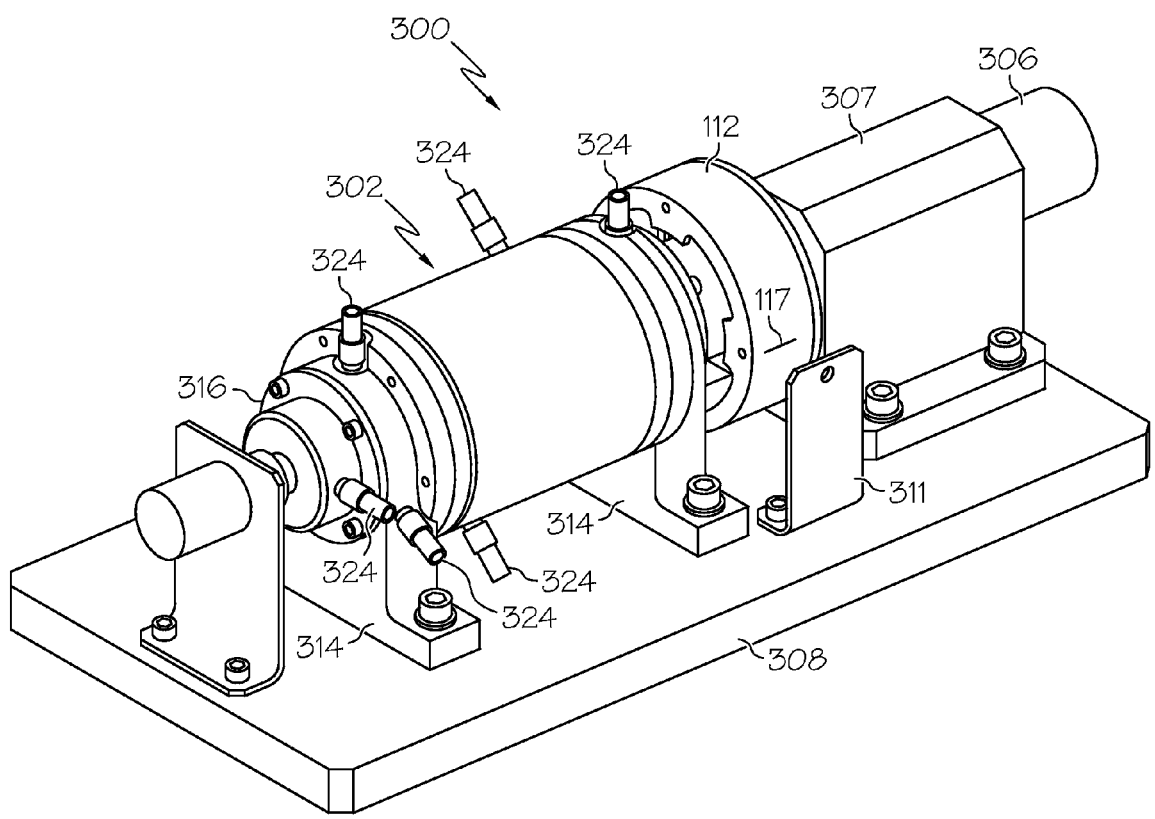
FIGS. 3 and 4 depict perspective and end views, respectively, of a test fixture with which the non-contact of FIG. 1 may be used.
Figure 4:
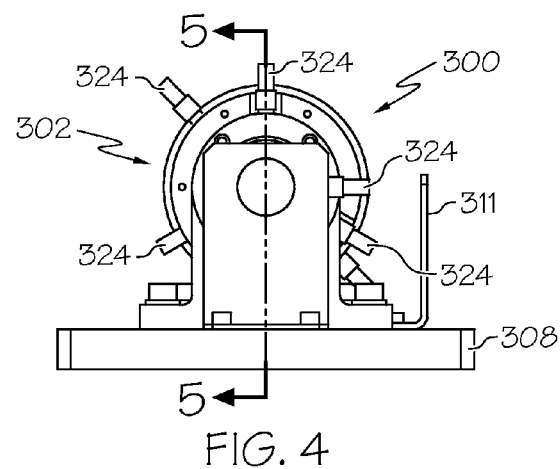
Figure 5:
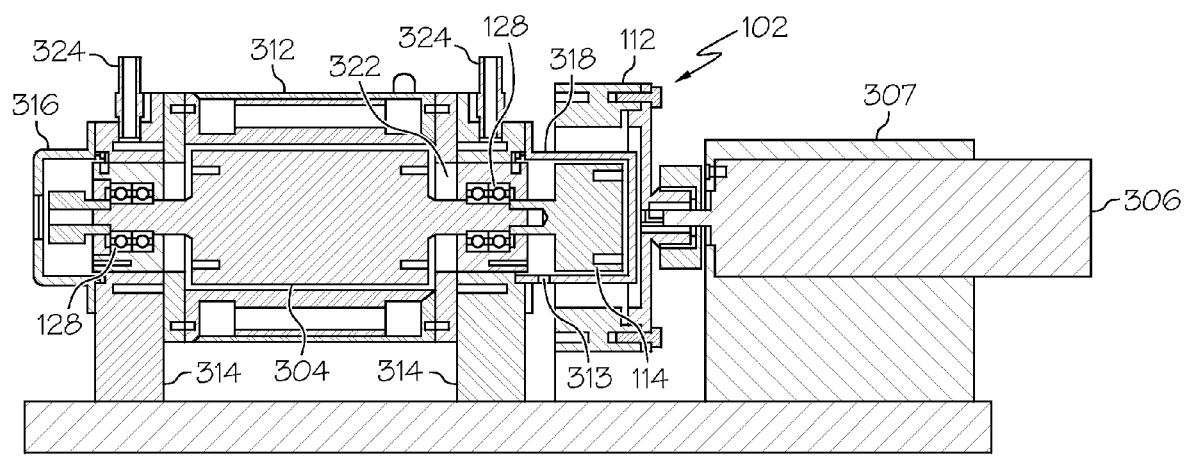
FIG. 5 depicts a cross section view of the exemplary test fixture depicted in FIGS. 3 and 4, taken along line 5-5 in FIG. 4.

The non-contact torque determination system 100 may be used to determine torque in any one of numerous systems, components, devices, and environments. In one particular preferred embodiment, the system 100 is implemented with a test fixture that is used to test bearing assemblies and to determine the drag torque of bearing assemblies. One particular physical embodiment of such a test fixture is depicted in FIGS. 3-5 and, for completeness, will now be described. In doing so it is noted that like reference numerals in FIGS. 1 and 3-5 refer to like parts.

Referring simultaneously to FIGS. 3-5, the test fixture 300 includes a housing assembly 302, a test shaft 304 (FIG. 5), and a drive torque source 306. The housing assembly 302 is mounted on a base 308 and includes, among other components, a cooling assembly 312, a plurality of bearing supports 314, a bearing cover 316, and a rotor cover 318. These components, when properly assembled together, define an inner volume 322 that is preferably evacuated and held at a vacuum pressure. Some of the depicted fittings 324 facilitate this evacuation. The remaining fittings 324 facilitate the flow of cooling into and through the cooling assembly 312.

The test shaft 304 is rotationally mounted and within the housing assembly inner volume 322 (FIG. 5) via a plurality of bearing assemblies 128. The bearing assemblies 128 are disposed within housing assembly inner volume 322 and are each mounted in the housing assembly 302. The test shaft 306 is coupled to the magnetically permeable rotor 114, which is also disposed within housing assembly inner volume 322. In particular, it is seen that the rotor cover 318 surrounds the magnetically permeable rotor 114 and encloses the magnetically permeable rotor 114 within the housing assembly inner volume 322. Though the test shaft 306 may be coupled to the magnetically permeable rotor 114 using any one of numerous techniques, in the depicted embodiment these components are coupled together via mating threads that are formed on each component.

The drive torque source 306 is mounted within a support, and coupled to, and is configured to supply a drive torque to, the magnetic rotor 112. As was alluded to above, the drive torque source 306 may be variously implemented. In the depicted embodiment, however, it is implemented using a drive motor. The drive motor 306, as may be appreciated, may also be variously implemented. For example, it may be implemented using any one of numerous pneumatic, hydraulic, or electric motors. In a particular preferred embodiment, the drive motor 304 is an electric motor.

The test fixture 300 is preferably used to determine the drag torque of the bearing assemblies 128. To do so, the test system 100 described above is implemented as part of the test fixture 300. Preferably, the first optical transceiver 104 (or associated probe 132) is mounted on a mounting bracket 311 (see FIGS. 3 and 4) that is secured to the base 308, and the second optical transceiver 106 (or associated probe 132) is sealingly disposed in and through an opening 313 (see FIG. 5) in the rotor cover 318.

The system 100 described herein determines bearing drag torque with an accuracy of about 0.01 in-ounces. The test system 100 provides these accurate torque determinations without having to mechanically couple the system 100 to the rotating load, and while thermally isolating the torque drive source from the rotating load.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for determining torque, comprising:
an outer rotor including an inner volume, the outer rotor responsive to a drive torque to rotate;
an inner rotor disposed at least partially within the inner volume of the outer rotor, the inner rotor spaced apart from, and magnetically coupled to, the outer rotor to rotate therewith;
a first optical transceiver disposed adjacent the outer rotor, the first optical transceiver configured to selectively transmit first incident light toward, and receive reflected first incident light from, the outer rotor, the first optical transceiver further configured to generate a first signal in response to received reflected first incident light;

a second optical transceiver disposed adjacent the inner rotor, the second optical transceiver configured to selectively transmit second incident light toward, and receive reflected second incident light from, the inner rotor the second optical transceiver further configured to generate a second signal in response to received reflected second incident light;

a processor coupled to receive the first signal and the second signal and configured, upon receipt thereof, to determine torque on the inner rotor.

2. The system of claim 1, wherein:
the outer rotor and the inner rotor comprise a magnetic coupling having a known angular stiffness; and
the processor is further configured to determine the torque based on the known angular stiffness and the first and second signals.

3. The system of claim 1, the outer rotor and the inner rotor each include an outer surface, and wherein the system further comprises:
a first reflective surface feature disposed on the outer surface of the outer rotor; and
a second reflective surface feature disposed on the outer surface of the inner rotor.

4. The system of claim 3, wherein the first and second reflective surface features each comprise one of a surface feature formed in the outer surface thereof or a reflective strip disposed on the outer surface thereof.

5. The system of claim 3, wherein:
the first optical transceiver is configured to generate the first signal with a characteristic variation each time the first reflective surface feature rotates past the first optical transceiver; and
the second optical transceiver is configured to generate the second signal with a characteristic variation each time the second reflective surface feature rotates past the second optical transceiver.

6. The system of claim 5, wherein the processor is configured to determine the torque on the inner rotor based on a phase difference between the first and second signals.

7. The system of claim 1, further comprising:
a drive motor coupled to the outer rotor and configured to supply the drive torque thereto;
a housing assembly having an inner volume;
a shaft disposed within the housing assembly inner volume and coupled to the inner rotor;
a plurality of bearing assemblies mounted within the housing assembly inner volume and rotationally mounting the shaft.

8. The system of claim 1, wherein the processor is configured to determine a drag torque of the bearing assemblies.

9. The system of claim 8, wherein the housing assembly inner volume is at a vacuum pressure.

10. The system of claim 9, further comprising:
a rotor cover coupled to the housing assembly and having an inner volume at the vacuum pressure, the rotor cover surrounding the inner rotor.

11. A system for determining torque, comprising:
a magnetic coupling having a known angular stiffness, the magnetic coupling adapted to receive an input torque and supply a drive torque to a load and including an outer rotor and a inner rotor, the outer rotor magnetically coupled to the inner rotor;
a first optical transceiver disposed adjacent the outer rotor, the first optical transceiver configured to selectively transmit first incident light toward, and receive reflected first incident light from, the magnetic outer rotor, the first optical transceiver further configured to generate a first signal in response to received reflected first incident light;

a second optical transceiver disposed adjacent the inner rotor, the second optical transceiver configured to selectively transmit second incident light toward, and receive reflected second incident light from, the magnetically permeable rotor the second optical transceiver further configured to generate a second signal in response to received reflected second incident light; and a processor coupled to receive the first signal and the second signal and configured to determine torque on the inner rotor based on the known angular stiffness and the first and second signals.

12. The system of claim 11, the outer rotor and the inner rotor each include an outer surface, and wherein the system further comprises:
a first reflective surface feature disposed on the outer surface of the outer rotor; and
a second reflective surface feature disposed on the outer surface of the inner rotor.

13. The system of claim 12, wherein the first and second reflective surface features each comprise one of a surface feature formed in the outer surface thereof or a reflective strip disposed on the outer surface thereof.

14. The system of claim 12, wherein:
the first optical transceiver is configured to generate the first signal with a characteristic variation each time the first reflective surface feature rotates past the first optical transceiver; and
the second optical transceiver is configured to generate the second with a characteristic variation signal each time the second reflective surface feature rotates past the second optical transceiver.

15. The system of claim 14, wherein the processor is configured to determine the torque on the inner rotor based on a phase difference between the first and second signals.

16. The system of claim 11, further comprising:
a drive motor coupled to the outer rotor and configured to supply the drive torque thereto;
a housing assembly having an inner volume;
a shaft disposed within the housing assembly inner volume and coupled to the inner rotor;
a plurality of bearing assemblies mounted within the housing assembly inner volume and rotationally mounting the shaft.

17. The system of claim 11, wherein the processor is configured to determine a drag torque of the bearing assemblies.

18. The system of claim 17, wherein the housing assembly inner volume is at a vacuum pressure.

19. The system of claim 18, further comprising:
a rotor cover coupled to the housing assembly and having an inner volume at the vacuum pressure, the rotor cover surrounding the rotor.

20. A method of determining torque in an environmentally isolated system, comprising the steps of:
coupling a drive system to the environmentally isolated system via a non-contact, magnetic coupling that has a known angular stiffness and at least two coupling sections;
optically measuring a relative deflection of each coupling section; and
determining the torque based on the relative deflection and the known angular stiffness.

* * * * *